United States Patent Office 2,852,566
Patented Sept. 16, 1958

2,852,566

PRODUCTION OF ARYL ETHERS

Arnold Emil Jeltsch, Pittsburgh, Pa., assignor to Koppers Company, Inc., a corporation of Delaware No Drawing. Application February 23, 1954
Serial No. 412,089

12 Claims. (Cl. 260—613)

This application is concerned broadly with the oxyethylation of phenol and alkyl-substituted phenols, hereinafter referred to as "phenolic bodies." Generally, it is concerned with the monooxyethylation of said phenolic bodies. More particularly, the invention is concerned with the monooxyethylation of said phenolic bodies by their reaction with ethylene oxide in the presence of a strong basic ion-exchange resin containing a plurality of quaternary ammonium hydroxide groups to produce betahydroxy-ethyl aryl ethers.

It is known in the art to utilize caustic materials such as, for example, sodium and potassium hydroxide in the reaction of ethylene oxide with phenols and alkyl phenols to produce polyoxyethylated substances. It has now been discovered that certain strongly basic ion-exchange resins as hereinafter described catalyze the reaction between phenols or alkyl-substituted phenols and ethylene oxide in such a manner as to produce the monooxyethylated products easily. That is, when utilizing these ionexchange resins as catalysts the absorption of ethylene oxide proceeds at a certain rate until approximately one molar quantity per molar quantity of phenolic body is absorbed. Thereupon there is noted a distinct decrease in the rate of absorption of ethylene oxide, in some instances, actual cessation of absorption. Thus, according to a process of this invention it is possible selectively to produce the monooxyethylated products, that is, betahydroxy-ethyl aryl ethers.

Phenol or any alkyl-substituted phenols can be monooxyethylated according to a procedure of this invention. However, it is to be noted that phenols having alkyl-substituents in either or both of the ortho positions react much more slowly than do the other alkyl-substituted phenols. Illustrative of the phenolic bodies which can be monoxyethylated according to this invention are phenol, cresol, xylenol, para-tertiary-butyl-phenol, paranonyl-phenol, di-butyl-meta-cresol and diamyl phenol.

In general, the invention comprises contacting ethylene oxide and a phenolic body in the presence of a catalytic amount of an infusible, insoluble ion-exchange resin containing a plurality of quaternary ammonium hydroxide groups until the rate of absorption of ethylene oxide decreases. Various infusible, insoluble resins can be utilized in the preparation of the infusible, insoluble resins containing quaternary ammonium hydroxide groups which are useful as catalysts herein. Such insoluble, infusible resins useful as starting materials are illustrated by copolymers of bifunctional ethylenic unsaturated monomers, such as divinylbenzene, butadiene, etc., and a vinyl aryl compound, such as, for example, styrene, vinyl naphthalene, etc. Chloromethylation of such insoluble, infusible copolymers containing aromatic nuclei followed by treatment with a tertiary-amine and subsequent treatment with aqueous caustic yields the insoluble, infusible resins containing quaternary ammonium hydroxide groups used herein. Another means of describing the ionexchange resins useful herein is to say that the suitable resins are those which act as solid insoluble caustic with only its hydroxyl ions free to move into solution. It is preferred that the resins be dried after treatment with caustic. This can be done, for example, by slurrying with a water miscible solvent such as acetone or ethanol or by passing such solvent through a column of the resin followed by filtration and air drying.

Excellent results are obtained utilizing insoluble, infusible resins containing quaternary ammonium hydroxide groups which have a capacity for neutralization of acid of approximately 1.5 to 2.5 milli-equivalents per gram of dry resin. "Amberlite" IRA–400 resin, a product of Rohm & Haas Company, Philadelphia, Pennsylvania, is an example of such a resin.

It is advantageous to utilize as a catalyst at least approximately 1 part or more of the ion-exchange resin per 100 parts phenolic body. Particularly good results are obtained utilizing 5 parts resin per 100 parts phenolic body when said phenolic bodies do not contain substituents in either of the ortho positions. When utilizing phenolic bodies having an alkyl substituent in either of the ortho positions, it is advantageous to use larger amounts of catalyst. Even then the reaction is considerably slower than when smaller amounts of catalyst are utilized with phenolic bodies having ortho positions free of substituents.

It will, of course, be realized that smaller quantities of stronger resins or larger quantities of weaker resins can be utilized provided the catalytic activity is approximately the same.

It is desirable to maintain the phenolic body and the catalyst at a temperature above approximately 100° C. during the time of reaction, that is, contact with ethylene oxide. Excellent results are obtained in the temperature range 150–250° C.

In this specification the terms "part" and "percent" mean part and percent by weight unless otherwise indicated.

The following examples are illustrative of the invention.

*Example I*

Five parts of "Amberlite" IRA–400 resin is washed with 4% sodium hydroxide solution to produce the hydroxyl form and then washed free of caustic with distilled water and dried. This resin is then admixed with 150 parts nonyl phenol in a suitable reaction vessel equipped with a stirrer and an inlet tube for ethylene oxide projecting below the level of the nonyl phenol. The temperature of the nonyl phenol is raised to and maintained at 180–190° C. while the mixture is stirred and ethylene oxide is fed through the inlet tube. After absorption of 29.9 parts ethylene oxide the rate of absorption of ethylene oxide drops to essentially zero and, upon continued addition of ethylene oxide, there is no evidence of further absorption.

The catalyst is filtered off and the product purified by distillation under vacuum. There is obtained betahydroxy-ethyl nonyl-phenyl ether.

*Example II*

The oxyethylation of Example I is repeated utilizing as a catalyst in place of the 5 parts "Amberlite" IRA–400 resin there used 0.5 part sodium hydroxide. Upon absorption of approximately 30 parts ethylene oxide, there is noted an increased rate of absorption of ethylene oxide. Upon continued addition of ethylene oxide there is obtained polyoxyethylated nonyl phenol, the degree of polyoxyethylation depending upon the amount of ethylene oxide delivered to the system.

Example III 150 parts para-tertiary-butyl-phenol is oxyethylated according to the procedure described in Example I in the presence of 7.5 parts "Amberlite" IRA–400 resin at 183–193° C. After absorption of 45 parts ethylene oxide, the absorption rate becomes practically negligible. Upon further addition of ethylene oxide, there is no evidence of absorption.

The catalyst is separated by filtration. Distillation of the product yields beta-hydroxy-ethyl para-tertiary-butylphenyl ether.

Example IV 150 parts phenol is oxyethylated according to the procedure of Example I in the presence of 7.5 parts "Amberlite" IRA–400 resin at approximately 175–185° C. Upon absorption of 70 parts ethylene oxide, there is a marked decrease in absorption rate. The addition of ethylene oxide is discontinued and the catalyst is separated by filtration. Distillation of the reaction product yields beta-hydroxy-ethyl phenyl ether.

It is observed that in the foregoing experiment if the addition of ethylene oxide is continued after the absorption of approximately 70 parts ethylene oxide, absorption continues at a much slower rate to give polyoxyethylated phenol. However, the marked decrease in absorption rate indicates completion of monooxyethylation and the reaction can be stopped at that point to yield the desired monooxyethylated product.

Substitution of equal molar quantities of para-cresol and meta-cresol in the foregoing procedure for the phenol there used yields respectively beta-hydroxy-ethyl para-cresyl ether and beta-hydroxy-ethyl meta-cresyl ether.

Example V 176 parts of a diamyl phenol is oxyethylated according to the procedure of Example I in the presence of 8.7 parts "Amberlite" IRA–400 resin at approximately 180–195° C. The rate of absorption of ethylene oxide is markedly lower than that which is observed in the foregoing examples. After the absorption of approximately 30 parts ethylene oxide, the absorption rate of ethylene oxide decreases to substantially zero. The catalyst is removed by filtration. Upon distillation there is obtained beta-hydroxy-ethyl diamyl-phenyl ether.

Repetition of the foregoing procedure utilizing an equal molar quantity of dibutyl-meta-cresol in place of the diamyl phenol there used yields beta-hydroxy-ethyl dibutyl-meta-cresyl ether and there is observed a similar reduction in rate of absorption of ethylene oxide.

The invention as hereinbefore set forth is embodied in particular form and manner but may be variously embodied within the scope of the claims hereinafter made.

What is claimed is:

1. A process for the monooxyethylation of phenolic bodies chosen from the class consisting of phenol and alkyl-substituted phenols comprising contacting gaseous ethylene oxide and said phenolic body in the presence of a catalytic amount of an insoluble, infusible ion-exchange resin containing a plurality of quaternary ammonium hydroxide groups until the rate of absorption of ethylene oxide markedly decreases, removing the catalyst from the reaction mixture and recovering therefrom the monooxyethylated phenolic body.

2. A process of claim 1 in which the ion-exchange resin has a capacity for neutralization of acid of approximately 1.5 to 2.5 milliequivalent per gram of resin.

3. A process of claim 1 in which the resin is used in an amount of at least one part per 100 parts phenolic bodies.

4. A process of claim 1 in which the resin is used in an amount of at least 5 parts per 100 parts phenolic bodies.

5. A process of claim 1 in which the phenolic body is phenol.

6. A process of claim 1 in which the phenolic body is nonyl phenol.

7. A process of claim 1 in which the phenolic body is para-tertiary-butyl phenol.

8. A process of claim 6 in which the ion-exchange resin has a capacity for neutralization of acid of approximately 1.5 to 2.5 milliequivalent per gram of resin and is used in an amount of 5 parts per 100 parts nonyl phenol.

9. A process for the monooxyethylation of nonyl phenol comprising introducing gaseous ethylene oxide below the surface of a mixture of nonyl phenol and a catalytic amount of an insoluble, infusible resin containing quaternary ammonium hydroxide groups, said resin having a capacity for neutralization of acid of approximately 1.5 to 2.5 milliequivalents per gram of dry resin until the rate of absorption of ethylene oxide drops to essentially zero; removing the catalyst from said mixture and recovering beta-hydroxy-ethyl nonylphenyl ether as a product therefrom.

10. A process for the monooxyethylation of tertiary-butyl phenol comprising introducing gaseous ethylene oxide below the surface of a mixture of tertiarybutyl phenol and a catalytic amount of an insoluble, infusible resin containing quaternary ammonium hydroxide groups, said resin having a capacity for neutralization of acid of approximately 1.5 to 2.5 milliequivalents per gram of dry resin until the rate of absorption of ethylene oxide drops to essentially zero; removing the catalyst from said mixture and recovering beta-hydroxy-ethyl paratertiary phenyl ether as a product therefrom.

11. A process for the monooxyethylation of phenol comprising introducing gaseous ethylene oxide below the surface of a mixture of phenol and a catalytic amount of an insoluble, infusible resin containing quaternary ammonium hydroxide groups, said resin having a capacity for neutralization of acid of approximately 1.5 to 2.5 milliequivalents per gram of dry resin until the rate of absorption of ethylene oxide drops to essentially zero; removing the catalyst from said mixture and recovering beta-hydroxy-ethyl phenyl ether as a product therefrom.

12. A process for the monooxyethylation of diamyl phenol comprising introducing gaseous ethylene oxide below the surface of a mixture of diamyl phenol and a catalytic amound of an insoluble, infusible resin containing quaternary ammonium hydroxide groups, said resin having a capacity for neutralization of acid of approximately 1.5 to 2.5 milliequivalents per gram of dry resin until the rate of absorption of ethylene oxide drops to essentially zero; removing the catalyst from said mixture and recovering beta-hydroxy-ethyl diamylphenyl ether as a product therefrom.

References Cited in the file of this patent

UNITED STATES PATENTS

| | | |
|---|---|---|
| 2,075,018 | Bruson et al. | Mar. 30, 1937 |
| 2,098,097 | Hopff et al. | Nov. 2, 1937 |
| 2,716,137 | Patton | Aug. 23, 1955 |

OTHER REFERENCES

Rohm & Haas Company, "Ion Exchange Report" #4. The Resinous Products Div., Washington Square, Philadelphia, Pa. (p. 4).